(12) United States Patent
Wood et al.

(10) Patent No.: US 7,184,887 B2
(45) Date of Patent: Feb. 27, 2007

(54) METHOD AND APPARATUS FOR CALCULATING A FIGURE OF MERIT FOR GPS POSITION USING NMEA 0183 OUTPUT

(75) Inventors: Christopher Richard Wood, St. Peters (AU); Owen Mace, South Australia (AU)

(73) Assignee: Neve Corp Pty Ltd, Mawson Lakes (AU)

( * ) Notice: Subject to any disclaimer, the term of this patent is extended or adjusted under 35 U.S.C. 154(b) by 143 days.

(21) Appl. No.: 10/498,330

(22) PCT Filed: Oct. 9, 2003

(86) PCT No.: PCT/AU03/01322

§ 371 (c)(1),
(2), (4) Date: Nov. 1, 2004

(87) PCT Pub. No.: WO2004/034080

PCT Pub. Date: Apr. 22, 2004

(65) Prior Publication Data
US 2005/0065722 A1    Mar. 24, 2005

(30) Foreign Application Priority Data
Oct. 10, 2002    (AU)    ............ 2002952041

(51) Int. Cl.
*G01S 1/00*   (2006.01)
*G01S 5/14*   (2006.01)
*G01C 21/10*  (2006.01)
*G01C 21/12*  (2006.01)

(52) U.S. Cl. .................. 701/213; 342/357.06
(58) Field of Classification Search ............ None
See application file for complete search history.

(56) References Cited

U.S. PATENT DOCUMENTS

| | | | |
|---|---|---|---|
| 5,416,712 A | 5/1995 | Geier et al. | |
| 5,862,511 A | 1/1999 | Croyle et al. | |
| 6,061,632 A | 5/2000 | Dreier | |
| 6,388,613 B1 * | 5/2002 | Nagatsuma et al. | ... 342/357.08 |

FOREIGN PATENT DOCUMENTS

| | | |
|---|---|---|
| EP | 0 629 877 A1 | 12/1994 |
| WO | WO 02/04974 A2 | 1/2002 |

OTHER PUBLICATIONS

Wood, C, etal, GPS*i*Dead Reckoning — Vehicle Positioning in the Urban Environment — White Paper: Product Overview , A Neve Technologies White Paper, Feb. 2001, pp. 1-16.

* cited by examiner

*Primary Examiner*—Michael J. Zanelli
(74) *Attorney, Agent, or Firm*—Klauber & Jackson LLC

(57) ABSTRACT

This invention relates to a method and apparatus for qualifying and quantifying the quality of navigational data emanating from any GPS receiver using its NMEA 0183 output messages for use in a dead reckoning system. It does this by deriving a first distance measurement travelled for a predetermined time period from a dead reckoning system or a GPS system. It then also calculates a second distance being the distance between two global positioning system (GPS) position measurements in the predetermined time. Finally, it calculates the difference between the first and second distances to derive a distance error. The statistical variance of the distance errors derived by repeating the above steps a predetermined number of times is representative of a figure of merit of a prior GPS position of the vehicle.

22 Claims, 4 Drawing Sheets

METHOD AND APPARATUS FOR CALCULATING A FIGURE OF MERIT FOR GPS POSITION USING NMEA 0183 OUTPUT

This invention relates to a method and apparatus for qualifying and quantifying the quality of navigational data emanating from any GPS receiver using its NMEA 0183 output messages for use in a dead reckoning system.

BACKGROUND OF THE INVENTION

Current land, air or sea going vehicle position determination arrangements most typically relies on the Global Positioning Systems (GPS). The GPS system comprises the use of three or more space vehicles (eg. satellites) in Low Earth Orbit that emit signals which when simultaneously received by a suitable receiver mounted to a vehicle can assist in the determination of the position of the vehicle. Specialised algorithms including triangulation techniques are used using the known location of three or more space vehicles. While the number of space vehicles received simultaneously is preferably four. The likelihood that a vehicle will receive signals from four space vehicles at any one time will vary with the particular GPS system used. However, 18 space vehicles in a suitably high orbit at any one time can provide a high probability of reception and broad coverage over the surface of the earth.

What a GPS receiver can provide is four variables. The first three are the x, y and z of the spatial coordinates of the mobile in a predetermined frame of reference. The fourth is its temporal coordinate (ie. the date at which the mobile is at the calculated position, this date being specified in universal time).

Commercial low cost GPS receivers at this time offer a 95% probability of providing calculated horizontal position solutions with errors of 15 meters or less. In other words, there is a 95% probability that the error in the horizontal position is 15 meters or less. Such figures are frequently quoted by GPS receiver manufacturers.

This level of accuracy is indicative when the GPS receiver is operating under ideal conditions. However, when the GPS receiver is operating in non-ideal conditions, such as those found in many urban areas, the observed performance is significantly worse. It is common to observe position errors of hundreds of meters or for the 95% error probability to be in excess of 40 meters.

However, this accuracy and the availability of the position solution can be greatly improved when the GPS solution is combined with speed and heading sensors associated with the vehicle to "dead reckon" the position of the vehicle from a known starting location or the last calculated position.

In some of the more expensive GPS receivers the integration of the positioning data from the GPS receiver to the dead reckoning sensors in the vehicle is tightly bound to the particular characteristics of a specific manufacturers GPS receiver. This means that the dead reckoning sensors provide their data direct to the proprietary algorithms used by the GPS receiver to calculate its position and time. In some respects such an approach is preferable since each manufacturers GPS receiver will know best how to deal with the vagaries of the dead reckoning sensors (eg. their particular accuracy's and operation). The GPS receiver will also know how best to introduce the dead reckoning data into the specific algorithms developed for the GPS receiver. In this case the statistical certainty of the dead reckoning sensor measurements provided to the GPS receiver is dealt with only once by a Kalman filter designed specifically to process such figures.

The practical outcome however is that users are locked into a particular GPS/dead reckoning vendor, the alternative being a major re-engineering effort when the GPS element of the system needs to change or the dead reckoning inputs change or to find an totally new GPS solution.

Thus, there exists a need for an accurate, flexible and cost-effective dead reckoning technology that can interface with any GPS receiver. Furthermore, and in accord with features that are available in the most expensive GPS systems it is an aim of the invention described herein to provide a method and means for qualifying and quantifying the quality of horizontal position data emanating from the chosen GPS receiver. In a practical embodiment of the invention, it produces a Figure Of Merit (FOM). The FOM can then be used to provide the best possible statistical certainty of the solution for position provided by the chosen GPS receiver.

Preferably, in providing such an approach, it is useful to use the industry standard NMEA-0183 data output by all GPS receivers as the basis for this determination. However not all the possible messages are made available by all GPS receivers. Thus, it is necessary in the embodiments described herein to use the minimum number of the most commonly available NMEA-0183 messages. This approach will allow the use of most if not all GPS receivers and selected dead reckoning sensors and their outputs and even the GPS receiver itself as inputs (ideally those dead reckoning sensor outputs readily available in current vehicles) so as to increase the availability and timeliness of a position solution of any GPS receiver, in particular those that are at the cheap end of the price range.

The industry standard for the format of serial digital messages that are output by GPS receivers is defacto governed by a United States organisation, the National Marine Electronics Association (NMEA) in standard NMEA-0183. The NMEA 0183 Interface Standard defines electrical signal requirements, data transmission protocol, time, and specific sentence formats for a 4800-baud serial data bus.

Very few automotive grade GPS receivers provide a FOM output. Those few that do, provide it via the manufacturer's proprietary message outputs. This is quite understandable, as the NMEA-0183 interface does not provide a mechanism for providing this information. Previously, it has been usual to use the various dilutions of precision (Position Dilution of Precision (PDOP), Horizontal Dilution of Position (HDOP) etc. and other measures such as signal to noise ratios and numbers of space vehicles used in the solution to formulate a view on solution quality. Such methods however, are largely insensitive to distortions arising from urban canyon effects. The present invention introduces a method and apparatus for determining a FOM that responds well to such error sources.

SUMMARY OF THE INVENTION

In an aspect of the invention, a method for producing a figure of merit for the quality of a GPS position of a vehicle includes the steps of:
a) deriving a first distance measurement travelled for a predetermined time period;
b) calculating a second distance being the distance between two global positioning system (GPS) position measurements in said predetermined time period;

c) calculating the difference between the first and second distances to derive a distance error d) calculating the statistical variance of the distance errors derived by repeating steps a) to c) a predetermined number of times wherein the statistical variance is representative of a figure of merit of a prior GPS position of said vehicle.

In a further aspect of the invention, an apparatus for determining the figure of merit of a global positioning system of vehicle having a distance or speed sensor and a global positioning system comprising:

a first distance determining means for calculating the distance travelled by said vehicle in a predetermined time;

a second distance determining means that derives said second distance from said global positioning system that calculates the distance travelled by said vehicle in a predetermined time;

a distance error determining means wherein all said determining means are operated a predetermined number of times;

a variance determining means to determine the variance of the predetermined number of distance errors which represents a figure of merit associated with a prior GPS position of said vehicle.

Specific embodiments of the invention will now be described in some further detail with reference to and as illustrated in the accompanying figures. These embodiments are illustrative, and not meant to be restrictive of the scope of the invention. Suggestions and descriptions of other embodiments may be included within the scope of the invention but they may not be illustrated in the accompanying figures or alternatively features of the invention may be shown in the figures but not described in the specification.

DESCRIPTION OF PREFERRED EMBODIMENTS OF THE INVENTION

Most dead reckoning technology is based on the fusion of data from two or more positioning systems into a composite position solution that exhibits better characteristics than any of the source positioning data taken by itself. In a GPS application, dead reckoning also provides greater availability of a position solution since GPS signals are not always available or necessarily accurate.

The current state of the art uses a Kalman filter as the data fusion engine for combining the data from multiple positioning systems to give a statistically optimal position solution that exhibits better characteristics than any of the source systems by themselves.

In order for the Kalman filter to combine the data from each source positioning system, preferably an estimate of the quality of the position data of each positioning system is required to give the system an indication of the probability of the position being accurate. More particularly even if a dead reckoning system is added to a GPS receiver, the required FOM quality metric is not available from the GPS receiver to allow the dead reckoning integration to occur.

Figure 1:
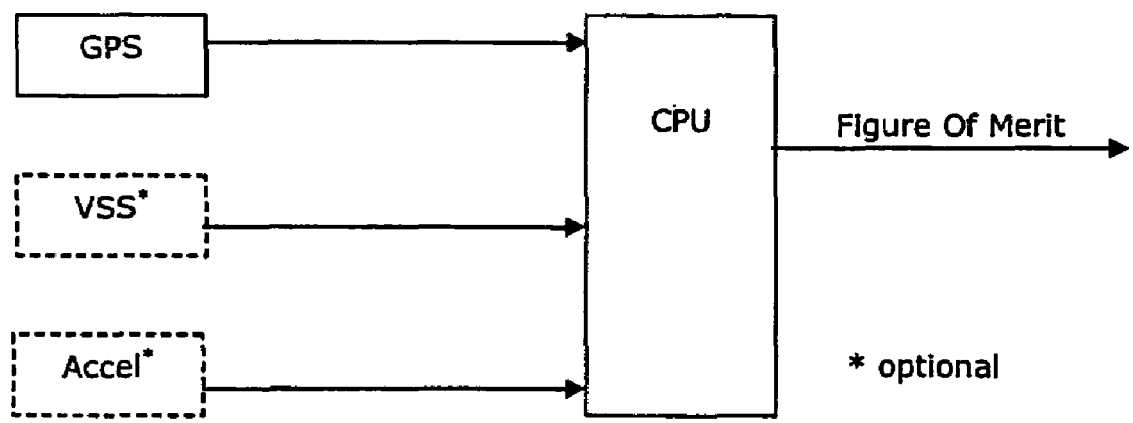
FIG. 1 depicts a block diagram of a generic embodiment of the invention using the output of a GPS receiver as well as optional output from a Vehicle Speed Sensor and/or an Acceleration Sensor.

FIG. 1 depicts a generic block diagram of an embodiment of the present invention that is an apparatus and pictorial method for calculating a FOM quality metric for any GPS receiver using only those data available via the industry standard NMEA-0183 messages that are output from most if not all GPS receivers.

In particular, in the embodiments described herein, one or more of the messages RMC [RMC=Recommended Minimum Configuration], GGA [GGA=Global Positioning System Fix Data], GLL [GLL=Geographic Position, Latitude/Longitude] and VTG [VTG=Track Made Good and Ground Speed] as is defined in the NMEA-0183 specification may be used. RMC contains: time, validity, position, speed, heading, date and optionally measurements from a separate speed measuring device that are used to create an FOM that can be used as an input to a Kalman filter. The Kalman filter is a second to the one to that used in the GPS receiver and is used to provide statistically significant position information resulting from the fusion of data. This is in contrast to the way in which a tightly bound proprietary GPS receiver/dead reckoning system approaches this problem. The Kalman filter uses the FOM together with the HDOP as indicators of the solution quality being produced by the GPS receiver at a particular time. With this information, the Kalman filter is able to make an estimate as to how much of the error between the dead reckoned solution and the GPS solution is attributable to the dead reckoning positioning system.

In this embodiment, a broad description of the method useable in a dead reckoning processor involves, for when the GPS solution is valid, a first distance measurement travelled over ground being derived from speed measurements. The chosen GPS receiver or another speed sensor such as a pulse type Vehicle Speed Sensor or Accelerometer may provide a speed measurement. Secondly calculating the distance between two GPS position measurements derives the second distance over ground. The difference between the distances calculated using speed and position yields a distance error term. The FOM of the GPS position solution at a specific time is calculated as the statistical variance of the distance error term over an appropriate number of samples. When the GPS solution is not valid then the FOM is set to some large maximum value. Both these approaches are displayed in FIG. 5.

In an example of the use of an apparatus according to the invention, the new dead reckoning processor intercepts the NMEA-0183 RMC messages from a chosen GPS receiver. The new dead reckoning processor replaces position, speed and heading with the dead reckoning solutions derived from the use of the GPS receiver position solution, and/or VSS or Acceleration Sensor when appropriate. In doing so the new dead reckoning processor includes in its calculations a quality information metric (a FOM) so that improved solution information can be provided to the user.

In use, the dead reckoning processor will significantly reduce errors common to GPS receivers that occur under several commonly occurring conditions. Further, as stated previously it will also improve the availability and timeliness of a position solution from the GPS equipment.

Common GPS problems include but are not limited to:

Multipath where signals from the space vehicle are reflected off one or more large objects such as buildings before they are received by the GPS receiver Shadowing where insufficient space vehicles at any one time are "visible" to the receiver to produce a reliable solution As such it is possible for there to be many interruptions to the position updating reports of the GPS receiver and when constant availability of position can be critical this will lead to a reduction in the performance of the GPS receiver. The most common conditions this occurs in include:

Time To First Fix (TTFF), when a receiver has been powered off for a period of time greater than the update period of the GPS receiver and then turned back on, there will be a period when no GPS solution is available. A solution can become available when three or more space vehicles have been acquired by the receiver but for common GPS receivers and GPS systems this process can be of the order of 60 to 90 seconds. However, when reception is poor as in the conditions described above the TTFF can be much greater. Thus for short journeys the receiver may never be in proper working order.

When the receiver is completely blocked from space vehicle reception for example when it is under cover such as in underground car parks, tunnels, covered bridges, etc.

These are conditions when dead reckoning systems are of critical assistance to a GPS receiver.

Figure 3:
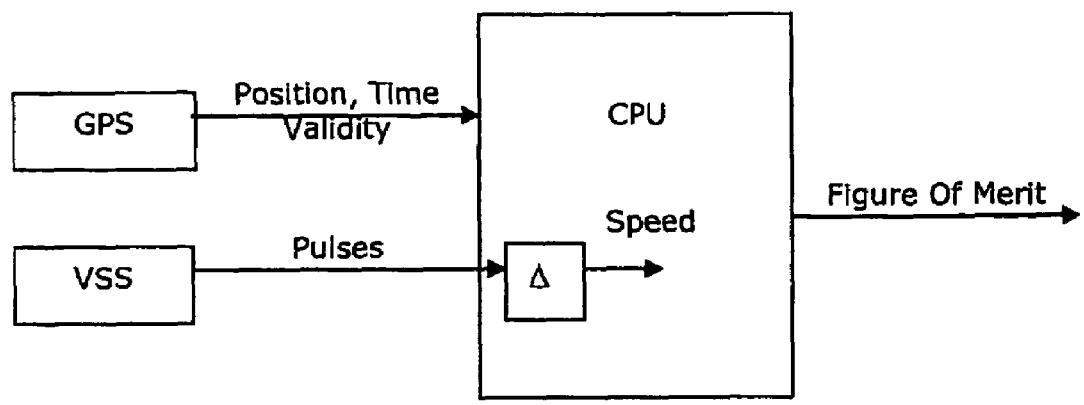
FIG. 3 depicts a specific embodiment of the invention using the output of a GPS receiver to provide time, position and solution validity where speed is derived by measuring pulses emanating from a pulse type vehicle speed sensor.

A preferred embodiment of the GPS FOM determination method using distance error variance according to the principles of the present invention and methodology is shown in FIG. 3. They are described below in more detail as it might be implemented using a GPS receiver and a speed-measuring device such as the Vehicle Speed Sensor (VSS) pulses available in most automobiles at this time.

Figure 2:
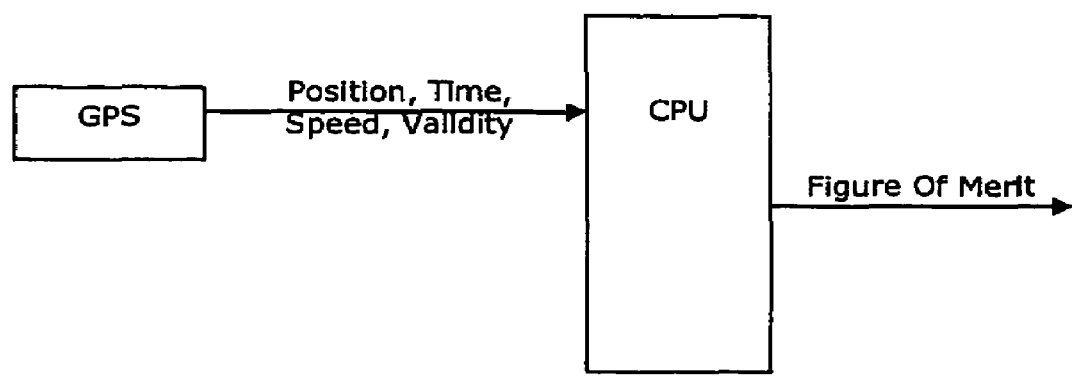
FIG. 2 depicts a specific embodiment of the invention using the output of a GPS receiver only to provide a Figure Of Merit value.
Figure 4:
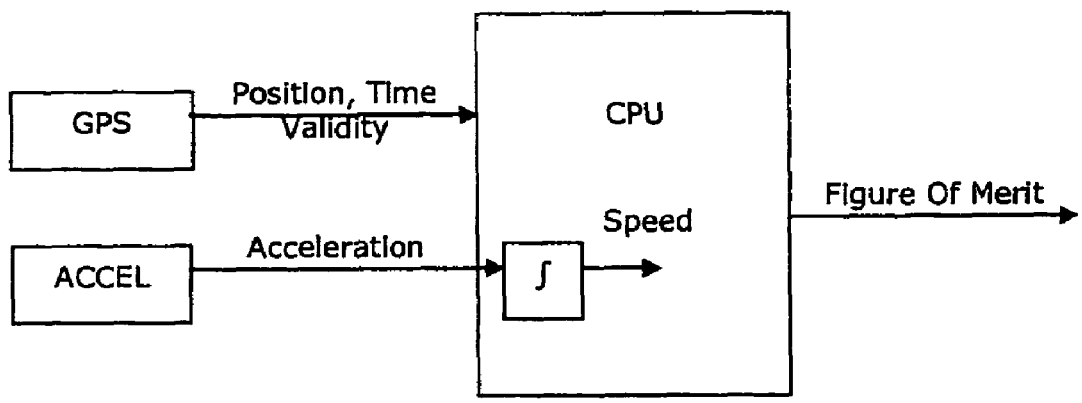
FIG. 4 depicts a specific embodiment of the invention using the output of a GPS receiver to provide time, position and solution validity where speed is derived by processing the output of an accelerometer mounted in the vehicle.

In alternative embodiments the VSS may be dispensed with in favour of speed measurements taken directly from the GPS receiver itself as depicted in FIG. 2 or derived from other sensors such as accelerometers as is depicted in FIG. 4.

Figure 5:
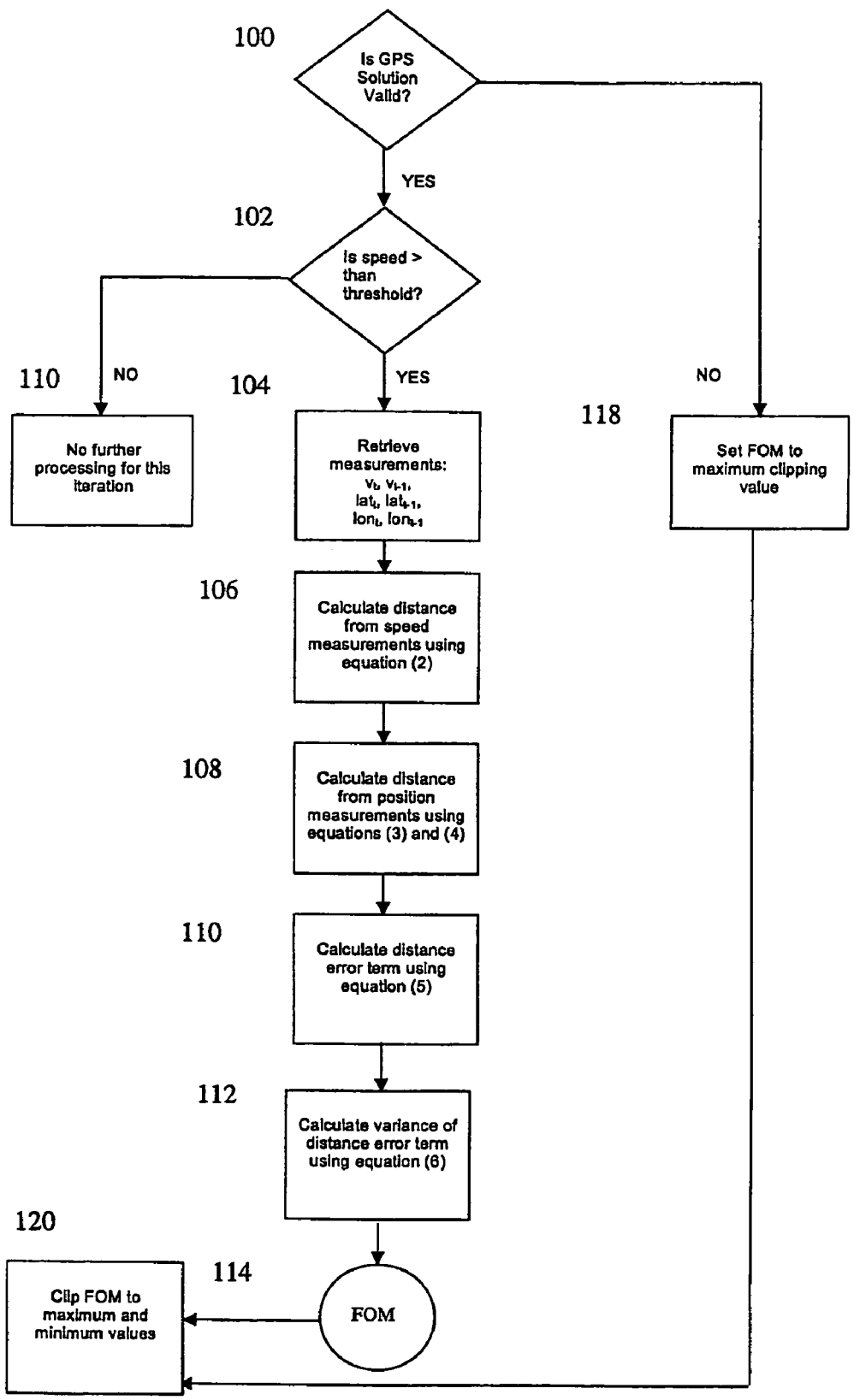
FIG. 5 is a flow chart that describes the detailed algorithm for calculating a FOM using the distance error variance method.

FIG. 5 depicts the corresponding steps of the method used to provide a FOM using a preferred embodiment. Those steps are described in more detail herein.

The following steps accord to the central path of the flow diagram depicted in FIG. 5.

The GPS receiver provides measurements of position (latitude and longitude) at accurate fixed intervals, in this case being one second. The VSS continuously provides speed measurements. The GPS position measurements are time stamped. For each GPS solution, the VSS speed measurements at that timestamp are retrieved at step 104.

The steps that follow are taken when the GPS receiver is producing measurements that are flagged as valid as indicated by the second field of the GPS RMC message having the value 'A' step 100:

The speed measurements are integrated to yield an estimate of elapsed distance over ground. Integration can be achieved using the equation:

$$s=(v*t)+(\tfrac{1}{2}*a*t^2) \qquad (1)$$

Because the time period between measurements is fixed at 1 second, equation (1) simplifies to:

$$s_v = v_{t-1} + \tfrac{1}{2}*(v_t - v_{t-1}) \qquad (2) \text{ as used in step 106.}$$

GPS measurements of latitude and longitude at the current timestamp t and t−1 are used to calculate the distance between the positions at these two times. This can be done by calculating the differences between the latitudes ($\theta_n$) and the longitudes ($\theta_e$) and converting these differences from angular units to distance units using the equation:

$$L = R*\theta \qquad (3) \text{ as used in step 108.}$$

R is the appropriate radius of curvature on the WGS84 reference ellipsoid plus the height of the GPS antenna above the ellipsoid. The overground distance is then given by:

$$s_p = (L_n^2 + L_e^2)^{1/2} \qquad (4) \text{ as used in step 108.}$$

The distance error term E is calculated as:

$$E = s_p - s_v \qquad (5) \text{ as used in step 110.}$$

Speed measurements are used to determine whether the vehicle is moving or stationary. When the vehicle is not moving or is moving very slowly, the error terms $s_p$ and $s_v$ will normally be very small. Under such conditions the error term is not indicative of the true magnitude of the error and must be rejected to prevent skewing of the data. For the preferred embodiment, the threshold speed can be set as a parameter. A typical value is 5 km/h.

Those values of E which are not rejected are used to calculate the variance of the distance error over a suitable number of data points n using the equation:

$$\mathrm{var}(E) = ((n*\mathrm{sigma}(E^2)) - (\mathrm{sigma}(E)*\mathrm{sigma}(E)))/(n*(n-1)) \qquad (6) \text{ as used in step 112.}$$

The FOM of the GPS position solution, the output from step 114, is given as var(E). The FOM calculated in this way is a pessimistic view of GPS quality as it includes historical information. The size of the sample used for calculating variance determines the extent of the historical weighting. For an automotive platform, a sample size of 10 gives good results. For other platforms such as pedestrian or marine, other samples sizes may be more appropriate where the value for n can be derived from simple experimentation.

The FOM value is clipped to suitable maximum and minimum values in step 120 to constrain its range to be compatible with the second navigation Kalman filter. The magnitude of the maximum and minimum FOM values are chosen relative to the other variances being managed by the Kalman filter.

This FOM is a quality indicator that directly reflects the level of confidence in the GPS solution. A large FOM (in this embodiment) indicates that the solution is of poor quality. The FOM can be arranged to range between any two values. In the embodiments described the range used is between 1 and 100 where 1 is the best possible value and 100 is the poorest possible value of the FOM. It is merely a matter of choice to use such a range, as the way in which the second Kalman filter deals with the FOM is a determining factor.

The steps that follow are taken when the GPS receiver is producing measurements that are flagged as invalid. As indicated by the second field in the GPS RMC message having the value 'V':

The following steps of the method accord to the right-hand path of the flow diagram depicted in FIG. 5.

The current estimate of the FOM is set to the maximum clipping value at step 118.

The following steps of the method accord to the left-hand path of the flow diagram depicted in FIG. 5.

If the calculated speed is less that a predetermined value say 5 kilometres per hour that no further processing of that iteration takes place, as shown at step 116.

Figure 6:
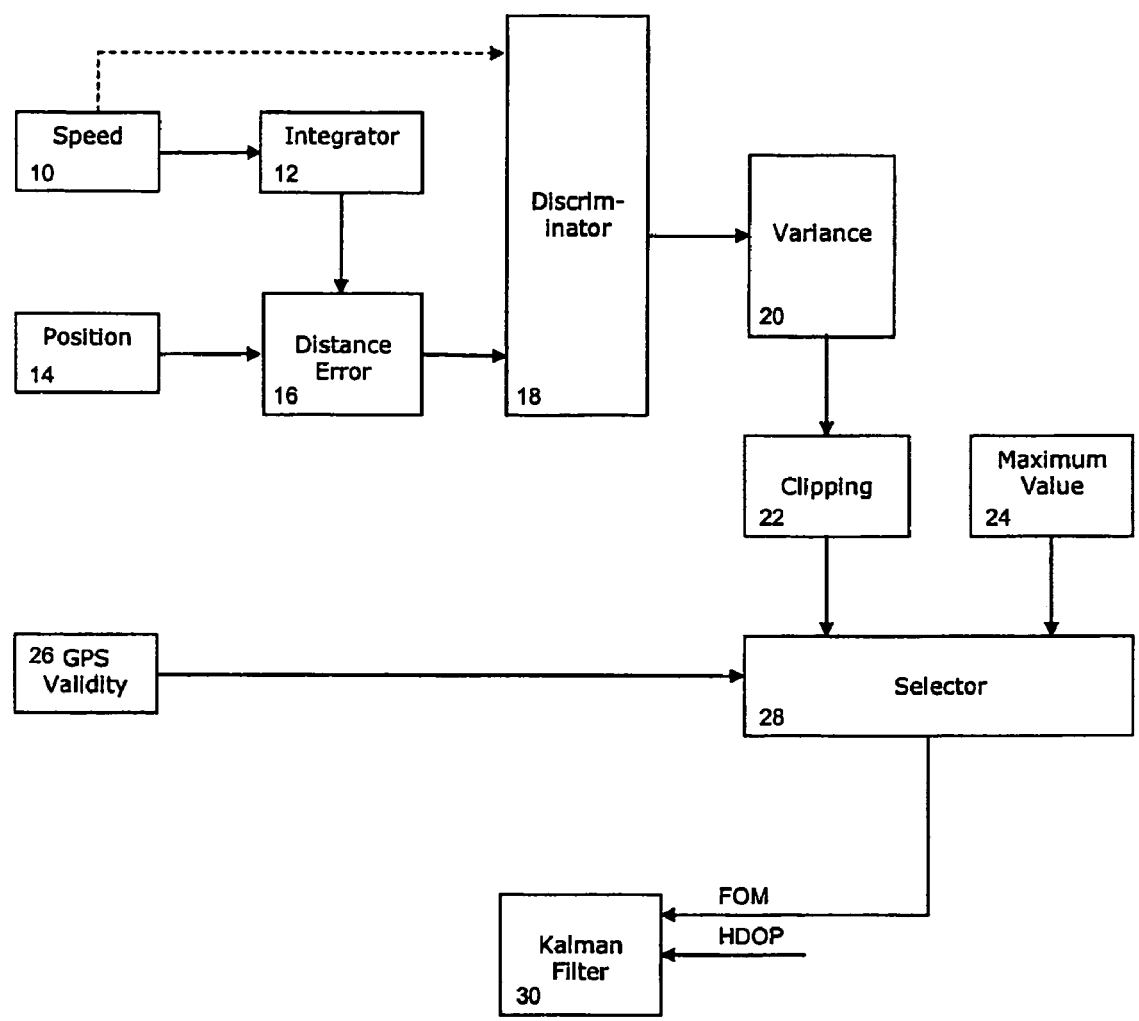
FIG. 6 depicts a particular embodiment of the invention using the output of a GPS receiver and/or other sensors to provide a Figure Of Merit value.

FIG. 6 depicts a functional block diagram of elements of an embodiment of the invention that uses the output of a GPS receiver and/or other sensors to provide a Figure Of Merit value.

In block 10, speed is measured or derived from the output of a suitable sensor.

In block 12, the first distance measurement is calculated using equation (2) with speed data output from block 10.

In block 14, the second distance measurement is calculated using equations (3) and (4) with position data measured from the GPS receiver.

In block 16, the Distance Error Term is calculated using equation (5) and the outputs of blocks 12 and 14.

In block 18, the speed of the vehicle is sensed using the output of block 10. If the speed falls below a threshold value, the Distance Error Term calculated in block 16 is rejected.

In block 20, the variance of the Distance Error Term is calculated using equation 6 and the output of block 18.

In block 22, the variance of the Distance Error Term output by block 20 is clipped to maximum and minimum values. These clipping values are configurable parameters and chosen to suit the application.

In block 24, the maximum and minimum clipping value parameters are stored.

In block 26, the GPS solution validity is determined from the corresponding field in the NMEA-0183 RMC message. If the field has the value 'A' the solution is valid.

In block 28, the validity of the GPS solution is sensed using the output of block 26. If the GPS solution is valid, the FOM is taken as the output of block 22. If the GPS solution is invalid, the FOM is taken as the maximum clipping parameter in block 24.

The Kalman filter (block 30) uses the FOM output from block 28 and a HDOP calculated by the GPS receiver to calculate a position measurement noise variance. The FOM term represents a measure of the errors induced by disturbances to the signals from the GPS satellites and the HDOP term represents a measure of the errors due to satellite constellation geometry.

It will be appreciated by those skilled in the art, that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications within its scope.

The invention claimed is:

1. A method for producing a figure of merit for the quality of a global positioning system position of a moving platform comprising the steps of:
    a) deriving a first distance measurement travelled for a predetermined time period;
    b) calculating a second distance being the distance between two global positioning system (GPS) position measurements in said predetermined time period;
    c) calculating the difference between the first and second distances to derive a distance error;
    d) calculating the statistical variance of the distance errors derived by repeating steps a) to c) a predetermined number of times wherein the statistical variance is representative of a figure of merit of a prior global positioning system position of said moving platform.

2. A method according to claim 1 wherein the calculation of the distance between two global positioning system position measurements uses a Recommended Minimum Configuration message of the NMEA-0183 standard.

3. A method according to claim 1 wherein the calculation of the distance between two global positioning system position measurements uses one or more of the GGA, VTG and GLL messages of the NEMA-1083 standard.

4. A method according to claim 1 wherein said statistical variance of the distance errors multiplied by the square of a HDOP value from the global positioning system is an indicator of a quality of a prior global positioning system determination of the position of the moving platform.

5. A method according to claim 1 wherein the first distance travelled is derived from speed measurements.

6. A method according to claim 5 wherein the speed measurement are taken from a moving platform speed sensor.

7. A method according to claim 5 wherein the speed measurement is taken from an accelerometer associated with said moving platform.

8. A method according to claim 5 wherein the speed measurement is taken from said global positioning system associated with said moving platform.

9. A method according to claim 5 wherein if a said speed measured is less than a predetermined speed the statistical variance is not calculated for that repeat of steps a) to c).

10. A method according to claim 1 wherein if the distance between two global positioning system position measurements in said predetermined period is not valid, the figure of merit is set to a predetermined value.

11. A method according to claim 1 further comprising the additional step of:
    (e) providing a figure of merit with a value between predetermined maximum and minimum values.

12. An apparatus for determining a figure of merit of a global positioning system of a moving platform having a distance or speed sensor and a global positioning system comprising:
    a first distance determining means for calculating a distance travelled by said moving platform in a predetermined time;
    a second distance determining means that derives a second distance from a distance between two said global positioning system position measurements in said predetermined time interval;
    a distance error determining means wherein said distance error is derived from the difference between said distance calculated by said first distance determining means and said second distance determined by said second distance determining means;
    a statistical variance determining means to determine the statistical variance of a predetermined number of distance errors which represents a figure of merit associated with a prior global positioning system position of said moving platform.

13. An apparatus according to claim 12 wherein said second distance determining means uses a Recommended Minimum Configuration message of the NMEA-1083 standard from said global positioning system.

14. An apparatus according to claim 12 wherein the calculation of the distance between two global positioning system position measurements uses one or more of the GGA, VTG and GLL messages of the NEMA-1083 standard.

15. An apparatus according to claim 12 wherein said statistical variance multiplied by the square of a HDOP value from the global positioning system is an indicator of a quality of a prior global positioning system determination of the position of said moving platform.

16. An apparatus according to claim 12 wherein the first distance determining means uses speed measurements from a speed sensor associated with said moving platform.

17. An apparatus according to claim 12 wherein the first distance determining means uses acceleration measurements from an accelerometer located on said moving platform.

18. An apparatus according to claim 12 wherein the first distance determining means uses speed measurements from said global positioning system.

19. An apparatus according to claim 16 further comprising a discriminator means for determining whether the speed provided to said apparatus is less than a predetermined speed and if so the distance error is not calculated for that time.

20. An apparatus according to claim 12 wherein if the distance between two global positioning system position measurements in said predetermined period is not valid, the figure of merit is set to a predetermined value.

21. An apparatus according to claim 20 wherein the figure of merit representation is a value between a predetermined maximum and minimum value.

22. A method according to claim 6 wherein if a said speed measured is less than a predetermined speed the statistical variance is not calculated for that repeat of steps a) to c).

* * * * *